(12) United States Patent
Tomizawa et al.

(10) Patent No.: US 10,312,768 B2
(45) Date of Patent: Jun. 4, 2019

(54) ELECTRIC MOTOR AND ELECTRIC POWER STEERING DEVICE USING SAME

(71) Applicant: DENSO CORPORATION, Kariya, Aichi-pref. (JP)

(72) Inventors: Hiroki Tomizawa, Kariya (JP); Koji Isogai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 167 days.

(21) Appl. No.: 15/600,471

(22) Filed: May 19, 2017

(65) Prior Publication Data
US 2017/0338713 A1    Nov. 23, 2017

(30) Foreign Application Priority Data
May 23, 2016    (JP) .................................. 2016-102315

(51) Int. Cl.
*H02K 5/173*    (2006.01)
*F16C 33/44*    (2006.01)
(Continued)

(52) U.S. Cl.
CPC ......... *H02K 5/1732* (2013.01); *F16C 25/083* (2013.01); *F16C 33/445* (2013.01);
(Continued)

(58) Field of Classification Search
CPC ........ H02K 5/1732; H02K 5/128; H02K 5/06; H02K 5/173; H02K 5/10; H02K 5/16;
(Continued)

(56) References Cited

U.S. PATENT DOCUMENTS 3,459,978 A * 8/1969 Helms .................. H02K 5/1732
310/51
3,546,504 A * 12/1970 Bottle ...................... H02K 5/15
310/216.017
(Continued)

FOREIGN PATENT DOCUMENTS

| JP | 2005-160267 | 6/2005 |
| JP | 2009-201255 | 9/2009 |
| JP | 2015-047037 | 3/2015 |

*Primary Examiner* — Mohammad A Musleh
(74) *Attorney, Agent, or Firm* — Knobbe, Martens, Olson & Bear, LLP

(57) ABSTRACT

An electric motor is provided which is designed to minimize a risk of corrosion or stress corrosion cracking of parts thereof and reduce mechanical vibration or noise. The electric motor includes an output shaft, a bearing which retains the output shaft, a frame, and a biasing member. The biasing member is made of austenite stainless steel and disposed between the bearing and a bottom wall of a bearing housing to elastically press the output shaft in a lengthwise direction thereof for eliminating mechanical noise arising from vibration of a rotor. The frame has a coating formed on an outer surface thereof for avoiding erosion thereof. The coating is not formed at least on a portion of the frame which faces the biasing member in order to induce sacrificial corrosion of the frame, which decelerates the corrosion of the biasing member to eliminate a risk of the stress corrosion cracking thereof.

10 Claims, 7 Drawing Sheets

(51) Int. Cl.
*F16C 33/82* (2006.01)
*H02K 5/06* (2006.01)
*H02K 5/128* (2006.01)
*F16C 25/08* (2006.01)
*F16C 33/38* (2006.01)
*F16C 33/56* (2006.01)
*F16C 33/76* (2006.01)
*H02K 5/16* (2006.01)
*F16C 19/06* (2006.01)
*F16C 19/54* (2006.01)
*H02K 5/10* (2006.01)
*H02K 5/24* (2006.01)
*H02K 7/10* (2006.01)
*H02K 11/33* (2016.01)

(52) U.S. Cl.
CPC .............. *F16C 33/82* (2013.01); *H02K 5/06* (2013.01); *H02K 5/128* (2013.01); *F16C 19/06* (2013.01); *F16C 19/54* (2013.01); *F16C 33/38* (2013.01); *F16C 33/565* (2013.01); *F16C 33/76* (2013.01); *F16C 2380/26* (2013.01); *H02K 5/10* (2013.01); *H02K 5/16* (2013.01); *H02K 5/173* (2013.01); *H02K 5/24* (2013.01); *H02K 7/1004* (2013.01); *H02K 11/33* (2016.01)

(58) Field of Classification Search
CPC ........ H02K 5/24; H02K 7/1004; H02K 11/33; F16C 33/82; F16C 33/445; F16C 25/083; F16C 2380/26; F16C 19/06; F16C 33/38; F16C 19/54; F16C 33/565; F16C 33/76
See application file for complete search history.

(56) References Cited

U.S. PATENT DOCUMENTS

| | | | |
|---|---|---|---|
| 3,553,663 A * | 1/1971 | Scholz | G11B 5/5521 346/68 |
| 2001/0030476 A1* | 10/2001 | Brown | H02K 7/083 310/90 |
| 2016/0272238 A1* | 9/2016 | Taniguchi | H02K 5/1732 |
| 2017/0104383 A1* | 4/2017 | Fujisaki | F16C 25/083 |

* cited by examiner

LOWER ← VERTICAL DIRECTION → UPPER

ELECTRIC MOTOR AND ELECTRIC POWER STEERING DEVICE USING SAME

CROSS REFERENCE TO RELATED DOCUMENT

The present application claims the benefit of priority of Japanese Patent Application No. 2016-102315 filed on May 23, 2016, the disclosure of which is incorporated herein by reference.

BACKGROUND

1 Technical Field

This disclosure relates generally to an electric motor and an electric power steering device using the same.

2 Background Art

Japanese Patent First Publication No. 2009-201255 teaches an electric motor which is used as an actuator for an electric power steering device of an automotive vehicle and equipped with a biasing member which urges an output shaft of the electric motor in an axial direction thereof. Specifically, the output shaft is retained at ends thereof by a first bearing and a second bearing. The biasing member urges the first bearing toward the second bearing, thereby pressing the output shaft in the axial direction thereof to minimize noise arising from mechanical vibration or resonance of a rotor of the electric motor in an axial direction of the rotor.

In the case where the biasing member of the electric motor is made of iron, it lead to a risk of settling thereof or a loss of a spring load produced thereby when subjected to high temperatures. In the case where the electric motor has a magnet attached to an end of the output shaft to measure, using a magnetic sensor, a magnetic flux produced by the magnet as indicating an angular position of the rotor of the electric motor, there is a risk that the biasing member made of metallic material is magnetized, which results in a disturbance to the operation of the magnetic sensor, thus leading to a decreased measurement accuracy thereof. In order to alleviate such problems, the biasing member may be made of austenite stainless steel.

The use of the austenite stainless steel for making the biasing member, however, encounters drawbacks in that residual stress remaining in the biasing member after produced or stress exerted on the biasing member when compressed may accelerate cracking due to corrosion thereof (i.e., stress corrosion cracking). In order to eliminate such a problem, a frame in which the bearings and the biasing member are disposed may be made of aluminum which is easier to corrode than stainless steel to induce sacrificial corrosion of the frame, thereby decelerating the corrosion of the biasing member to eliminate the risk of the stress corrosion cracking.

However, when the electric motor is installed on a lower portion of the body of the vehicle, it will lead to a risk that the frame become eroded by splashing with water. In order to improve corrosion resistance of the frame, a coating may be formed on a surface of the frame by means of alumite treatment, but however, it will disturb the sacrificial corrosion which minimizes the risk of the stress corrosion cracking of the frame.

SUMMARY

It is therefore an object to provide an electric motor which is designed to minimize a risk of corrosion or stress corrosion cracking of parts thereof and reduce mechanical vibration or noise and also provide an electric power steering device using such an electric motor.

According to one aspect of the disclosure, there is provided an electric motor which drives a given target. The electric motor comprises: a cylindrical casing, a first frame, a second frame, an annular stator, a winding, a first bearing, a second bearing, a shaft, a rotor, and a biasing member.

The cylindrical casing has a first end and a second end opposed to the first end.

The first frame is made of metallic material containing aluminum and covers the first end of the cylindrical casing. The first frame has a first recess and a first hole formed therein. The first recess is formed in a middle portion of the first frame which faces the cylindrical casing. The first hole communicates between one of surfaces of the first frame which is farther away from the cylindrical casing and a first bottom wall that is a bottom of the first recess.

The second frame is made of metallic material containing aluminum and covers the second end of the cylindrical casing to define a storage chamber between itself and the first frame in the cylindrical casing. The second frame has a second recess formed in a middle portion thereof which faces the cylindrical casing.

The annular stator is disposed in the storage chamber coaxially with the cylindrical casing. The annular stator is held from rotating relative to the cylindrical casing.

The winding is wound around the stator.

The first bearing is mounted in the first recess with an outer wall thereof fit in a first inner wall that is a cylindrical inner wall of the first recess.

The second bearing is mounted in the second recess with an outer wall thereof fit in a second inner wall that is a cylindrical inner wall of the second recess.

The shaft has a given length with a first end portion and a second end portion and is retained by the first frame and the second frame to be rotatable. The first end portion passes through the first hole to connect with the target and has an outer wall fit in an inner wall of the first bearing so that the first end portion is retained by the first bearing. The second end portion has an outer wall fit in an inner wall of the second bearing, so that the second end portion is retained by the second bearing.

The rotor has an outer wall facing an inner wall of the stator and an inner wall fit on an outer wall of the shaft, so that the rotor is rotatable together with the shaft.

The biasing member is made of austenite stainless steel and disposed between the first bottom wall and the first bearing or between a second bottom wall that is a bottom wall of the second recess and the second bearing. The biasing member urges the shaft through the first bearing or the second bearing in an axial direction of the shaft.

The coating is disposed on an outer surface of the first frame or the second frame.

The outer surface of the first frame or the second frame includes a coating-occupied area where there is the coating and a coating-unoccupied area where there is not the casting. The coating-unoccupied area is provided on at least a portion of the outer surface of the first frame or the second frame which faces the biasing member.

As apparent from the above discussion, the biasing member works to press the shaft in the axial direction thereof, thereby minimizing noises arising from mechanical vibration or resonance of the rotor in the axial direction thereof. The biasing member is, as described above, made of austenite stainless steel, thus minimizing a risk of settling thereof or a loss of a spring load produced thereby when subjected to high temperatures.

The coating covers the outer surfaces of the first frame and the second frame, thus increasing a degree of resistance of the first and second frames to corrosion thereof.

The coating-unoccupied area occupies at least the portion of the surface of the first frame or the second frame which faces the biasing member, thereby causing the surface of the first frame or the second frame which is made of metallic material containing aluminum to sacrificially corrode to minimize the risk of the stress corrosion cracking in the biasing member.

BRIEF DESCRIPTION OF THE DRAWINGS

The present invention will be understood more fully from the detailed description given hereinbelow and from the accompanying drawings of the preferred embodiments, which, however, should not be taken to limit the invention to the specific embodiments but are for the purpose of explanation and understanding only.

In the drawings:

FIG. 4 is a front view which

DESCRIPTION OF THE PREFERRED EMBODIMENTS

Electric motors and electric power steering devices according to embodiments will be described below in detail with reference to the drawings. Throughout the drawings, the same reference numbers will refer to the same parts.

First Embodiment

Figure 2:
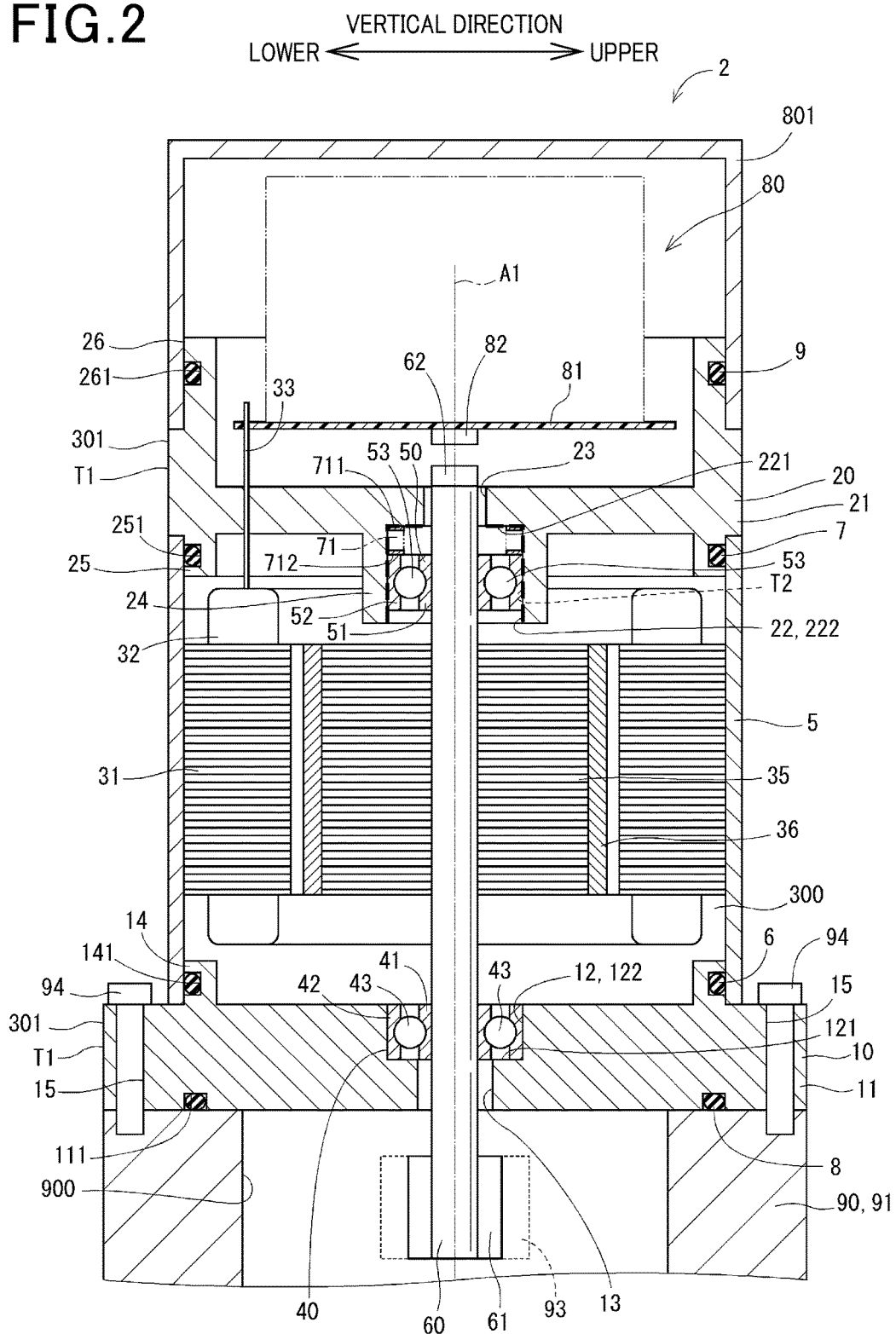
FIG. 2 is a longitudinal sectional view which illustrates an electric motor according to the first embodiment.

FIG. 2 illustrates the electric motor 2 according to the first embodiment. The electric motor 2 is supplied with electric power to produce torque and used in, for example, an electric power-steering device mounted in vehicles, such as automobiles, to assist a vehicle operator in turning the steering wheel.

Figure 1A:
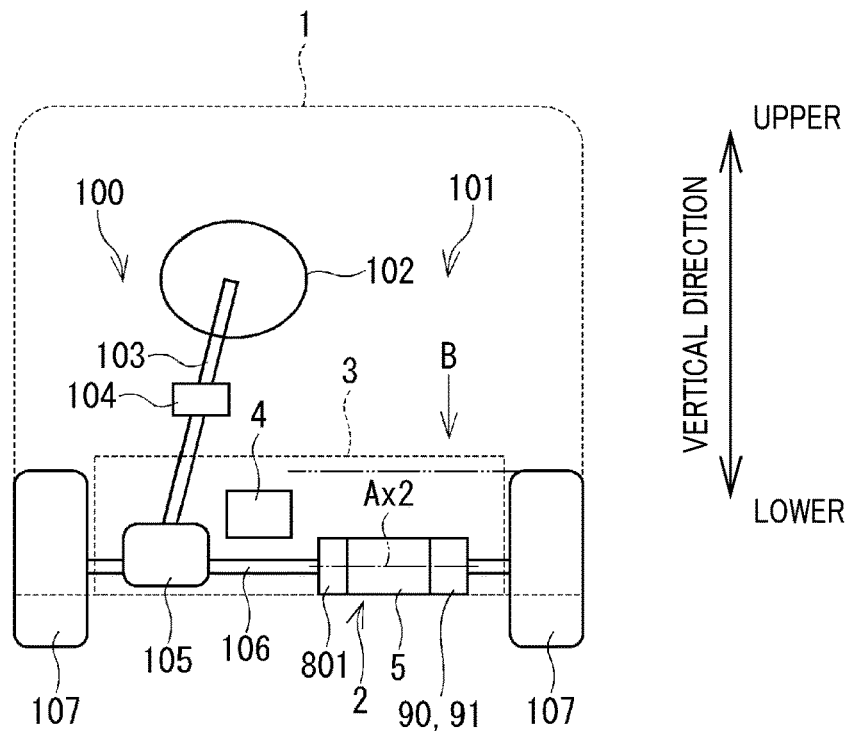
FIG. 1(A) is a schematic view which illustrates an electric motor according to the first embodiment which is used with an electric power steering device.

FIG. 1(A) illustrates an entire structure of the steering system 100 equipped with the electric power steering device 101. The electric power steering device 101 is equipped with the torque sensor 104 mounted on the steering shaft 103 connecting with the steering wheel 102. The torque sensor 104 works to measure a degree of steering torque exerted by an operator or a driver of the vehicle 1 on the steering shaft 103 through the steering wheel 102.

The steering shaft 103 has the pinion gear 105 mounted on an end thereof. The pinion gear 105 meshes with the rack shaft 106. The rack shaft 106 has a pair of wheels 107 secured to ends thereof through a tie rod to be rotatable.

When the driver turns the steering wheel 102, it will cause the steering shaft 103 connecting with the steering wheel 102 to be rotated. The rotation of the steering shaft 103 is converted into linear motion of the rack shaft 106 through the pinion gear 105, thereby steering the wheels 107 by an angle given as a function of a distance the rack shaft 106 is moved by the linear motion.

The electric power steering device 101 is equipped with the electric motor 2 which produces assist torque to augment driver's effort for steering the vehicle 1 and the rack gear 90 which reduces the speed of rotation of the electric motor 2 and transmits it to the rack shaft 106. The electric motor 2 is secured to the housing 91 of the rack gear 90.

The electric motor 2 is disposed in, for example, the engine compartment 3 of the vehicle 1. The electric motor 2 is implemented by, for example, a three-phase brushless motor and actuated by electric power supplied from the storage battery 4 mounted in the vehicle 1. The electric motor 2 is designed to rotate the rack gear 90 either in a normal direction or in a reverse direction. The rack gear 90 is a target object actuated by the electric motor 2 in this disclosure. The electric power steering device 101 includes the torque sensor 104 and a vehicle speed sensor which measures the speed of the vehicle 1.

The electric power steering device 101 analyzes outputs from the torque sensor 104 and the vehicle speed sensor to produce the assist torque through the electric motor 2 which augments the steering effort of the steering wheel 102 and transmit it to the rack shaft 106 through the rack gear 90. The electric power steering device 101, as apparent from the above discussion, functions as the so-called rack-assist electric power steering device. More specifically, the electric motor 2 is arranged in parallel to the length of the rack shaft 106. The electric power steering device 101 is, thus, a rack-parallel electric power steering device.

The electric motor 2 is, as illustrated in FIG. 2, equipped with the casing 5, the first frame 10, the first sealing member 6, the second frame 20, the second sealing member 7, the stator 31, the winding 32, the first bearing 40, the second bearing 50, the output shaft 60, the rotor 35, the biasing member 71, the coating 301, the magnet 62, and the control unit 80.

The casing 5 is of a hollow cylindrical shape. Specifically, the casing 5 is formed by a hollow cylinder made of metal such as iron. The casing 5 has an outer surface coated with a zinc nickel plating in order to enhance corrosion resistance of the casing 5.

The first frame 10 is made of metal containing aluminum. Specifically, the first frame 10 is made of aluminum die-cast. The first so frame 10 includes the first frame body 1, the first recess 12, the first hole 13, the cylinder 14, and a plurality of through-holes 15.

The first frame body 11 is made of a circular disc. The first frame body 11 covers a first end that is one of opposed open ends of the casing 5.

The first recess 12 is formed in a middle portion of an outer surface of the first frame body 11 which faces the casing 5. The first recess 12 is in the shape of a chamber formed in the outer surface of the first frame body 11 to have a given depth. The first recess 12 has the first bottom wall 121 with an annular flat surface and the first inner wall 122 which is substantially cylindrical. The first hole 13 is formed to establish communication between the first bottom wall 121 and the outer surface of the first frame body 11 farther away from the casing 5. In other words, the first hole 13 extends through a thickness of a central portion of the first frame body 11.

The cylinder 14 is substantially an annular protrusion formed on the outer surface of the first frame body 11 which faces the casing 5. The cylinder 14 has an outer wall fit in an inner wall of the casing 5. The cylinder 14 has the annular groove 141 recessed in the outer wall thereof.

The first sealing member 6 is formed by an annular elastic member made of, for example, rubber. The first sealing member 6 is fit in the groove 141. The first sealing member 6 is disposed between the cylinder 14 of the first frame 10 and the casing 5 to create a liquid-tight seal between the first frame 10 and the casing 5.

The through-holes 15 are formed in a radially outer portion of the cylinder 14 and extend through a thickness of the first frame body 11.

The second frame 20 is made of metal containing aluminum. Specifically, the second frame 20 is made of aluminum die-cast. The second frame 20 includes the second frame body 21, the second recess 22, the second hole 23, the protrusion 24, the cylinder 25, and the cylinder 26.

The second frame body 21 is substantially a hollow cylinder. The second frame body 21 closes a second end that is the open end of the casing 5 which is opposite the open end (i.e., the first end) of the casing closed by the first frame body 11, thereby defining the storage chamber 300 between itself and the first frame 10 within the casing 5.

The second recess 22 is formed in a middle portion of the second frame 20 which faces the casing 5. The protrusion 24 is formed in the shape of a hollow cylinder on a middle portion of the second frame body 21 which faces the casing 5. The protrusion 24 extends toward the casing 5. The second recess 22 is defined by an inner wall of the protrusion 24 and has a depth extending from an outer end surface of the protrusion 24 away from the first frame 10. The second recess 22 has the second bottom wall 221 with an annular flat surface and the second inner wall 222 which is substantially cylindrical.

The second hole 23 is formed to establish communication between the second bottom wall 221 and the outer surface of the second frame body 21 farther away from the casing 5. In other words, the second hole 23 extends through a thickness of a central portion of the second frame body 21.

The cylinder 25 is in the shape of an annular protrusion formed on the outer surface of the second frame body 21 which faces the casing 5. The cylinder 25 has an outer peripheral wall fit in the inner wall of the casing 5. The cylinder 25 has the annular groove 251 formed in the outer peripheral wall thereof.

The second sealing member 7 is made of an annular elastic member made of, for example, rubber. The second sealing member 7 is fit in the groove 251. The second sealing member 7 is disposed between the cylinder 25 of the second frame 20 and the casing 5 to create a liquid-tight seal between the second frame 20 and the casing 5.

The cylinder 26 is in the shape of an annular protrusion formed on the outer surface of the second frame body 21 farther away from the casing 5. The cylinder 26 has the annular groove 261 formed in an outer peripheral wall thereof.

The stator 31 is of a cylindrical shape and made of a stack of iron-made thin annular discs. The stator 31 is disposed in the storage chamber 300 with an outer wall thereof placed in contact with the inner wall of the casing 5. In other words, the stator 31 is mounted inside the storage chamber 300 coaxially with the casing 5 and held from rotating relative to the casing 5.

The winding 32 is made of metallic material such as copper and wound around the stator 31. The winding 32 is equipped with the winding extension 33. The winding extension 33 is made of metallic material, such as copper, in the shape of a bar. The winding extension 33 extends from the winding 32 straight and passes through a hole of the second frame body 21 to have an end located outside the outer surface of the second frame body 21 which is farther away from the casing 5.

The first bearing 40 is mounted in the first recess 12 with an outer peripheral wall thereof placed in contact with the first inner wall 122 of the first recess 12.

The second bearing 50 is mounted in the second recess 22 with an outer peripheral wall thereof placed in contact with the second inner wall 222 of the second recess 22. The second bearing 50 is located at an interval away from the second bottom wall 221, thereby defining an annular chamber between itself and the second bottom wall 221.

The shaft 60 is made of, for example, a metallic bar. The shaft 60 has a given length with a first end portion and a second end portion opposed to the first end portion. The shaft 60 passes through the first hole 13 (i.e., the first end portion) and has the first end portion connectable or connected to the rack gear 90. The shaft 60 also has the first end portion whose outer wall is fit in an inner wall of the first bearing 40. The shaft 60 has the second end portion whose outer wall is fit in an inner wall of the second bearing 50. In other words, the second end portion is retained by the second bearing 50. The shaft 60 is held by the first frame 10 and the second frame 20 through the first bearing 40 and the second bearing 50 to be rotatable.

The first bearing 40 is equipped with the first inner cylinder (i.e., an inner race) 41, the first outer cylinder (i.e., an outer race) 42, and the first balls 43.

The first inner cylinder 41 is made of, for example, a hollow cylindrical metallic body. The first inner cylinder 41 has an inner wall fit on the outer wall of the shaft 60 and is held from moving relative to the shaft 60. The first outer cylinder 42 is made of, for example, a hollow cylindrical metallic body. The first outer cylinder 42 has an outer wall fit in the first inner wall 122 and is movable relative to the first frame 10. The first balls 43 are made of, for example, metallic spherical balls. The first balls 43 are mounted between the first inner cylinder 41 and the first outer cylinder 42 so that the first inner cylinder 41 and the first outer cylinder 42 are rotatable relative to each other. Specifically, the first bearing 40 is implemented by a ball bearing and retains the first inner cylinder 41 to be rotatable relative to the first outer cylinder 42. The first frame 10, therefore, supports the shaft 60 to be smoothly rotatable through the first bearing 40.

The first bearing 40 has air gaps or plays between the first inner cylinder 41 and the first balls 43 and between the first outer cylinder 42 and the first balls 43 in an axial direction of the first inner cylinder 41, so that the first inner cylinder 41, the first balls 43, and the first outer cylinder 42 are moveable relative to each other in the axial direction of the first bearing 40 (i.e., the first inner cylinder 41) within a range set by the size of the plays, in other words, they are stopped by each other from moving outside the range in the axial direction of the first bearing 40.

The second bearing 50 includes the second inner cylinder (i.e., an inner race) 51, the second outer cylinder 52 (i.e., an outer race), and a plurality of second balls 53.

The second inner cylinder 51 is made of, for example, a hollow cylindrical metallic body. The second inner cylinder 51 has an inner wall fit on the outer wall of the shaft 60 and is held from moving relative to the shaft 60. The second outer cylinder 52 is made of, for example, a hollow cylindrical metallic body. The second outer cylinder 52 has an outer wall fit in the second inner wall 222 and is movable relative to the second frame 20. The second balls 53 are made of, for example, metallic spherical balls. The second balls 53 are mounted between the second inner cylinder 51 and the second outer cylinder 52 so that the second inner cylinder 51 and the second outer cylinder 52 are rotatable relative to each other. Specifically, the second bearing 50 is implemented by a ball bearing and retains the second inner cylinder 51 to be rotatable relative to the second outer cylinder 52. The second frame 20, therefore, supports the shaft 60 to be smoothly rotatable through the second bearing 50.

The second bearing 50 has air gaps or plays between the second inner cylinder 51 and the second balls 53 and between the second outer cylinder 52 and the second balls 53 in an axial direction of the second inner cylinder 51, so that the second inner cylinder 51, the second balls 53, and the second outer cylinder 52 are moveable relative to each other in the axial direction of the second bearing 50 (i.e., the second inner cylinder 51) within a range set by the size of the plays, in other words, they are stopped by each other from moving outside the range in the axial direction of the second bearing 50.

The rotor 35 is of a cylindrical shape and made of a stack of iron-made thin annular discs. The rotor 35 has an outer wall facing the inner wall of the stator 31 and also has an inner wall fit on the outer wall of the shaft 60 so that it is rotatable together with the shaft 60.

The rotor 35 has a plurality of magnets 36 mounted on the outer wall thereof. The magnets face the inner wall of the stator 31. The magnets 36 are implemented by permanent magnets made of, for example, rear-earth elements. The magnets 36 are arranged on the outer periphery of the rotor 35 at equal intervals away from each other in the circumferential direction of the rotor 35. The magnets 36 are secured to the outer wall of the rotor 35 using, for example, adhesive agent.

The biasing member 71 is made of austenite stainless steel. The biasing member 71 is disposed between the second bottom wall 221 that is the bottom of the second recess 22 and the second bearing 50. The biasing member 71 urges the shaft 60 toward the first bearing 40 through the second bearing 50.

Figure 4:
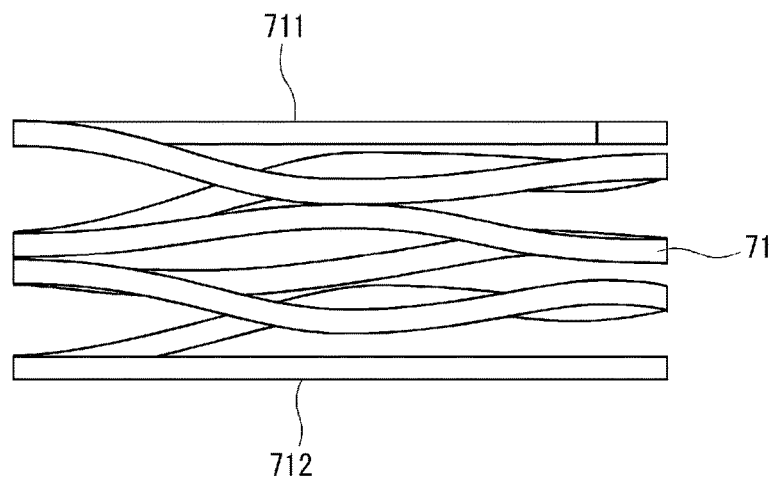

Specifically, the biasing member 71 is, as illustrated in FIG. 4, implemented by a coiled-wave spring. Specifically, the biasing member 71 is made of a flat strip wound in the shape of a coil and has opposed ends 711 and 712. The biasing member 71 has a waved middle portion between the ends 711 and 712. The biasing member 71, thus, has a relatively high residual stress generated in a production process thereof and a relative high stress developed when the biasing member 71 is compressed.

The biasing member 71 has a small variation in spring pressure produced thereby in a circumferential direction thereof. The biasing member 71 is capable of producing a required degree of spring pressure even though it has a relatively short length in the axial direction thereof as compared with another type of spring, thus enabling the biasing member 71 to be arranged in a narrow space between the second bottom wall 221 and the second bearing 50 and to exert a desired degree of spring pressure on the shaft 60 to urge it toward the casing 5.

Figure 3:
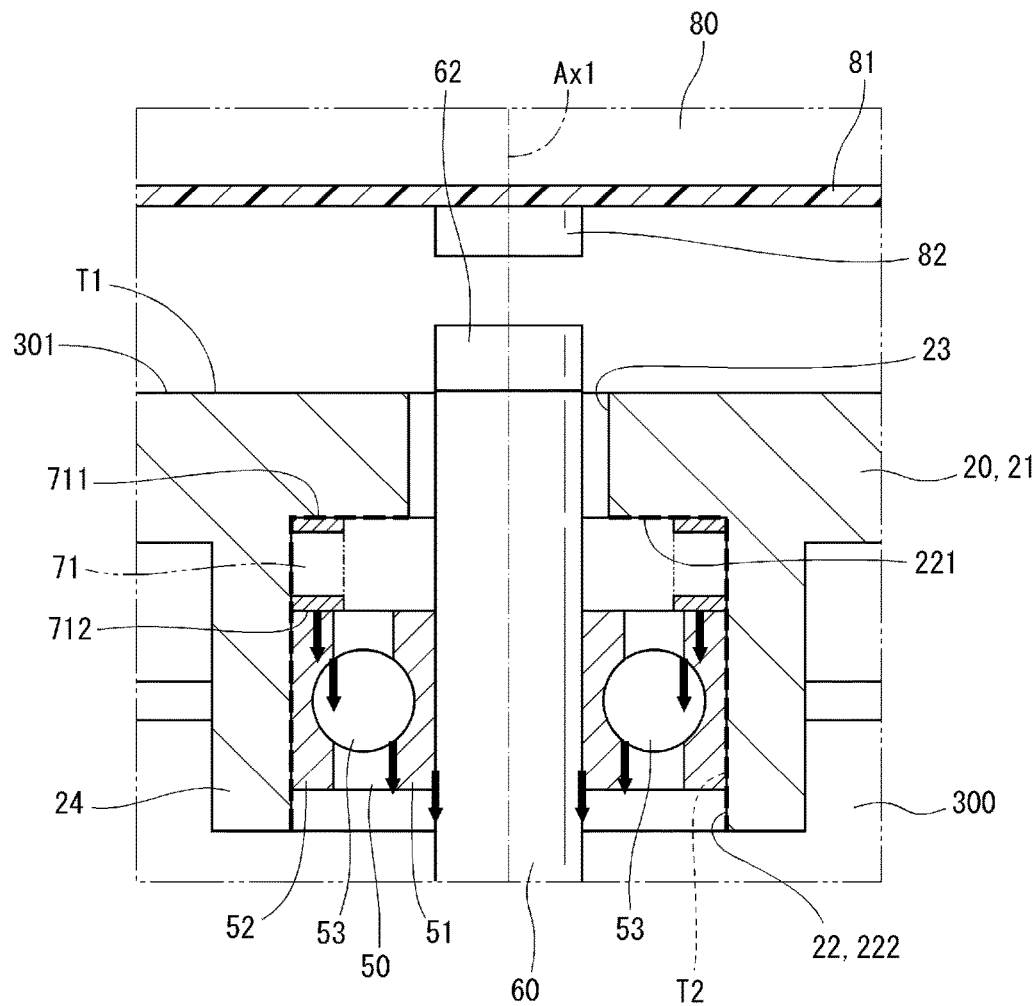
FIG. 3 is a partially enlarged sectional view which illustrates a portion of the electric motor of FIG. 2 in which a biasing member is mounted.

Specifically, the biasing member 71 is compressed in the axial direction thereof (i.e., the second bearing 50) and mounted between the second bottom wall 221 and the second bearing 50. The biasing member 71, as can be seen in FIG. 3, has the end 711 placed in contact with the second bottom wall 221 and the end 712 placed in contact with one of opposed ends of the second outer cylinder 52 which faces the second bottom wall 221, so that it biases the second outer cylinder 52 toward the first bearing 40. This causes the second outer cylinder 52 to press the second balls 53 toward the first bearing 40, so that the second balls 53 urge the second inner cylinder 51 toward the first bearing 40, thereby pressing the shaft 60 in the lengthwise direction of the shaft 60. This causes the plays between the second inner cylinder 51 and the second balls 53 and between the second outer cylinder 52 and the second balls 53 to be eliminated. In FIG. 3, forces or pressures exerted by one of parts on another are indicate by black arrows. The biasing member 71 is contactable with the second inner wall 222.

When urged by the biasing member 71, the shaft 60 presses the first inner cylinder 41, the first balls 43, and the first outer cylinder 42 of the first bearing 40 away from the second bearing 50, thereby eliminating the plays between the first inner cylinder 41 and the first balls 43 and between the first outer cylinder 42 and the first balls 43 and also pressing the end of the first outer cylinder 42 which faces the first bottom wall 121 against the first bottom wall 121. The inner diameter of the first hole 13 is selected to be greater than the outer diameter of the first inner cylinder 41, so that the first inner cylinder 41 is not stopped by the first bottom wall 121 from moving in the axial direction thereof.

The coating 301 covers the surfaces of the first frame 10 and the second frame 20. Specifically, the coating 301 is made of, for example, alumite film (also called anodic oxide coating) and formed on the first frame 10 and the second frame 20 using alumite treatment.

The outer surfaces of the first frame 10 and the second frame 20 have coating-occupied areas T1 where there is the coating 301 and a coating-unoccupied area T2 where there is not the coating 301. Specifically, the first frame 10 has the coating-occupied area T1 which ranges over an entire area of the outer surface of the first frame 10. In other words, the outer surface of the first frame 10 is entirely covered with the coating 301. The second frame 20, as can be seen in FIG. 3, has both the coating-occupied area T1 covering a portion of the outer surface excluding the second bottom wall 221 and the second inner wall 222 and the coating-unoccupied area T2 occupying outer surfaces of the second bottom wall 221 and the second inner wall 222. In FIG. 3, the coating-unoccupied area 72 is indicated by thick broken lines.

In this embodiment, the coating-unoccupied area T2 ranges over at least a portion of the outer surface of the second frame 20 which faces the biasing member 71. In other words, the coating-unoccupied area 72 occupies at least a portion of the outer surface of the second frame 20 which is placed in direct contact with the biasing member 71. The coasting 301 is not placed in contact with the biasing member 71.

The coating-unoccupied area T2 may be formed by masking a portion of the outer surface of the second frame 20 where there are the second bottom wall 221 and the second inner wall 222 and then alumite-treating the outer surface of the second frame 20.

Figure 1B:
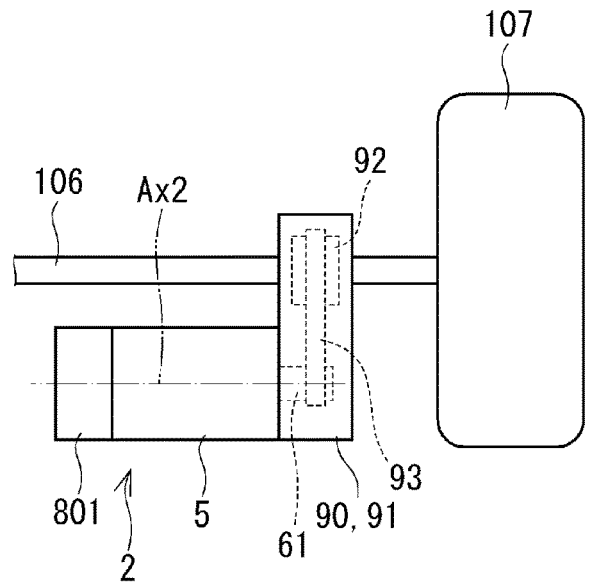
FIG. 1(B) is a partially schematic illustration, as viewed from an arrow B in FIG. (A)

The electric motor 2, as illustrated in FIG. 2, has the first frame 10 fixed to the housing 91 of the rack gear 90, so that the electric motor 2 is secured to the rack gear 90. The housing 91 is made of an aluminum die-cast in the shape of a box. The housing 91, as can be seen in FIGS. 1(B) and 2, has disposed therein the pulley 92 that is an input of the rack gear 90 and the belt 93 wound around the pulley 92.

The joint of the first frame 10 to the rack gear 90 is achieved by placing the surface of the first frame body 11 farther away from the casing 5 in contact with a surface of the housing 91 around the opening 900 and then screwing the fasteners 94, such as bolts, into the housing 91 through the through-holes 15.

The first frame body 11 has the groove 111 formed therein. The groove 111 is of an annular shape and has a depth extending from the surface of the first frame body 11 facing the rack gear 90 toward the casing 5. The sealing member 8 is fit in the groove 111. The sealing member 8 is made of an annular elastic material such as rubber and disposed between the first frame 10 and the housing 91 of the rack gear 90 to create a liquid-tight seal between the first frame 10 and the housing 91.

The pulley 61 is mounted on an end of the shaft 60 which is located closer to the rack gear 90. The pulley 61 is made of, for example, a metallic hollow cylinder. The pulley 61 is rotatable together with the shaft 60. The pulley 61 has formed in an outer wall thereof a plurality of grooves (not shown) extending in an axial direction thereof. The belt 93 is, as illustrated in FIGS. 1(B) and 2, wound around the pulley 92 that is an input of the rack gear 90 and the pulley 61 of the electric motor 2. The rotation of the rotor 35, thus, causes the shaft 60 and the pulley 61 to rotate, thereby outputting torque, as produced by the rotor 35, from the pulley 61 to the rack gear 90.

The magnet 62 is mounted on the end of the shaft 60 which is farther away from the pulley 61. The magnet 62 is rotated together with the shaft 60 following rotation of the rotor 35. The magnet 62 is located on the opposite side of the second frame body 21 to the casing 5.

The control unit 80 is, as can be seen in FIG. 2, arranged on the opposite side of the second frame 20 than to the casing 5.

The control unit 80 includes a microcomputer which is a typical compact computer made up of a CPU, a ROM and a RAM. The control unit 80 (i.e., the CPU of the microcomputer) executes given tasks according to programs stored in the ROM.

The control unit 80 includes the substrate (i.e., a circuit board) 81 and the magnetic flux sensor 82.

The substrate 81 is located at a given distance from the second frame body 21 on the opposite side of the second frame body 21 than the casing 5 is. The end of the winding extension 33 which is father away from the winding 32 is joined to the substrate 81.

The magnetic flux sensor 82 is a semiconductor sensor including a magnetic sensing device such as a Hall IC. The magnetic flux sensor 82 is arranged on the substrate 81 near the magnet 62 mounted on the shaft 60. More specifically, the magnetic flux sensor 82 is, as clearly illustrated in FIG. 2, located on the axis line (i.e., a longitudinal center line) Ax1 of the shaft 60 and faces the magnet 62. The magnetic flux sensor 82 is responsive to a change in magnetic flux (i.e., a magnetic field), as generated by the magnet 62, to provide a signal indicative thereof. The control unit 80 receives the signal outputted from the magnetic flux sensor 82 and uses it to calculate an angular position (i.e., an angle of rotation) of the rotor 35.

The control unit 80 works to calculate a required degree of assist torque as a function of the speed of the vehicle 1 using the angular position of the rotor 35, as measured by the magnetic flux sensor 82, a degree of steered torque, as measured and outputted by the torque sensor 104, and vehicle speed information, as outputted from a CAN (Controller Area Network). The control unit 80 then supplies electric power, as required to produce the assist torque, from the storage battery 4 to the winding 32 through the winding extension 33 to assist the driver in turning the steering wheel 102. In brief, the control unit 80 is responsive to the signal from the magnetic flux sensor 82 to regulate the amount of electric power delivered to the winding 32 to control the rotation of the rotor 35.

The cover 801 is arranged on the opposite side of the control unit 80 to the second frame 20. The cover 801 is made of, for example, a resinous hollow cylinder with a bottom. The cover 801 has an inner periphery covering the control unit 80. The cover 801 has an inner wall of an open end portion thereof which is fit on the outer wall of the cylinder 26 of the second frame 20. The cover 801 serves as a protector to protect the control unit 80 from external physical impact, dust, or liquid such as water.

The sealing member 9 is fit in the groove 261 formed in the outer peripheral wall of the cylinder 26. The sealing member 9 is made of, for example, an annular elastic material such as rubber. The sealing member 9 is disposed between the cylinder 26 of the second frame 20 and the cover 801 to create a liquid-tight seal between the second frame 20 and the cover 801.

The electric motor 2 is, as illustrated in FIG. 1, secured to the housing 91 of the rack gear 90 so as to have the axis line (i.e., a longitudinal center line) Ax2 of the casing 5 extending substantially parallel to the length of the rack shaft 106. In other words, the electric motor 2 is oriented relative to the housing 91 to have the axis line Ax2 extending perpendicular to the vertical direction. The electric motor 2 is located beneath a line extending in the horizontal direction through upper ends of the wheels 107 of the vehicle 1. This undesirably causes the electric motor 2 to be sometimes exposed to muddy water, salt water (e.g., snow melting agent usually used in snowy regions or sea water adhered to sand on the coast.

a) As apparent from the above discussion, the electric motor 2 of this embodiment is used to drive the rack gear 90 and equipped with the casing 5, the first frame 10, the second frame 20, the stator 31, the winding 32, the first bearing 40, the second bearing 50, the shaft 60, the rotor 35, the biasing member 71, and the coating 301. The casing is of a hollow cylindrical shape.

The first frame 10 is made of metallic material containing aluminum and covers the end of the casing 5. The first frame 10 has the first recess 12 formed in the central portion thereof facing the casing 5 and the first hole 13 which communicates between the end so surface of the first frame 10 farther away from the casing 5 and the first bottom wall 121 that it the bottom of the first recess 12.

The second frame 20 is made of metallic material containing aluminum and covers the end of the casing 5 farther away from the first frame 10. The second frame 20 defines the storage chamber 300 formed between the casing 5 and the first frame 10 and has the second recess 22 formed in the central portion thereof facing the casing 5.

The stator 31 is of an annular shape and disposed inside the storage chamber 300 coaxially with the casing 5. The stator 31 is held from rotating relative to the casing 5.

The winding 32 is disposed in the stator 31.

The first bearing 40 is mounted in the first recess 12 with the outer peripheral wall thereof fit in contact with the first inner wall 122 that is the cylindrical inner peripheral wall of the first recess 12.

The second bearing 50 is mounted in the second recess 22 with the outer peripheral wall thereof fit in contact with the second inner wall 222 that is the cylindrical inner peripheral wall of the second recess 22.

The shaft 60 passes through the first hole 13 to have the end joined to the rack gear 90. The shaft 60, as described above, has the given length with the first end portion and the second end portion opposed to the first end portion. The shaft 60 has the outer wall of the first end portion fit in the inner wall of the first bearing 40. The shaft 60 has the outer wall of the second end portion fit in the inner wall of the second bearing 50. In other words, the second end portion is supported by the second bearing 50. The shaft 60 is, thus, retained by the first frame 10 and the second frame 20 to be rotatable.

The rotor 35 has the outer wall facing the inner wall of the stator 31 and the inner wall fit on the outer periphery of the shaft 60, so that the rotor 35 is rotatable together with the shaft 60.

The biasing member 71 is made of austenite stainless steel. The biasing member 71 is disposed between the second bottom wall 221 that is the bottom of the second recess 22 and the second bearing 50. The biasing member 71 urges the shaft 60 in the axial direction thereof through the second bearing 50.

The coating 301 covers the outer surfaces of the first frame 10 and the second frame 20.

In this embodiment, the outer surfaces of the first frame 10 and the second frame 20 have the coating-occupied areas T1 where there is the coating 301 and the coating-unoccupied area T2 where the coating 301 does not exist. The coating-unoccupied area T2 occupies at least a portion of the outer surface of the second frame 20 which faces the biasing member 71.

The biasing member 71, as described above, functions to elastically press the shaft 60 in the lengthwise direction of the shaft 60, thereby minimizing noises arising from mechanical vibration or resonance of the rotor 35 in the axial direction thereof. The biasing member 71 is made of austenite stainless steel, thus minimizing a risk of settling thereof or a loss of a spring load produced thereby when subjected to high temperatures.

The coating 301, as described above, covers the surfaces of the first frame 10 and the second frame 20, thereby resulting in an enhanced corrosion resistance of the first frame 10 and the second frame 20.

The electric motor 2 has the coating-unoccupied area T2 on the second frame 20 in which the coating 301 is not formed. The coating-unoccupied area T2 occupies at least a portion of the surface of the second frame 20 which faces the biasing member 71, thereby inducing the corrosion of the surface of the second frame 20 (i.e., the coating-unoccupied area T2) which is made of metallic material containing aluminum, which will minimize the risk of crack formation in the biasing member 71 resulting from stress acting thereon or corrosion thereof (i.e., stress corrosion cracking).

b) In this embodiment, the second frame 20 has formed therein the second hole 23 which communicates between the surface of the second frame 20 farther away from the casing 5 and the second bottom wall 221.

The shaft 60 has the second end portion which is retained by the second bearing 50 and passes through the second hole 23.

The electric motor 2 of this embodiment also includes the magnet 62 and the control unit 80. The magnet 62 is located in alignment with the end of the shaft 60. The control unit 80 is arranged on the opposite side of the second frame 20 to the casing 5 and equipped with the magnetic flux sensor 82 to measure the magnetic flux produced by the magnet 62. The control unit 80 analyzes the output from the magnetic flux sensor 82 to determine an amount of electric power supplied to the winding 32 to control the rotation of the rotor 35. The electric motor 2 is a so-called controller-integrated motor and thus permitted to be installed along with the control unit 80 within a limited narrow space in the engine compartment 3 of the vehicle 1.

The biasing member 71 is arranged in the vicinity of the magnet 62 and the magnetic flux sensor 82. The biasing member 71 is, however, made of austenite stainless steel, so that it is hardly magnetized, thus minimizing a risk that the magnetic flux sensor 82 undergoes disturbances arising from the magnetization of the biasing member 71. This ensures a required measurement accuracy of the magnetic flux sensor 82.

c) The first bearing 40 is equipped with the first inner cylinder (i.e., an inner race) 41, the first outer cylinder (i.e., an outer race) 42, and the plurality of first balls 43. The first inner cylinder 41 has the inner wall fit on the outer wall of the shaft 60 and is held from moving relative to the shaft 60. The first outer cylinder 42 has the outer wall fit in the first inner wall 122 and is movable relative to the first frame 10. The first balls 43 are mounted between the first inner cylinder 41 and the first outer cylinder 42 so that the first inner cylinder 41 and the first outer cylinder 42 are rotatable relative to each other.

The second bearing 50 includes the second inner cylinder (i.e., an inner race) 51, the second outer cylinder 52 (i.e., an outer race), and the plurality of second balls 53. The second inner cylinder 51 has the inner wall fit on the outer wall of the shaft 60 and is held from moving relative to the shaft 60. The second outer cylinder 52 has the outer wall fit in the second inner wall 222 and is movable relative to the second frame 20. The second balls 53 are mounted between the second inner cylinder 51 and the second outer cylinder 52 so that the second inner cylinder 51 and the second outer cylinder 52 are rotatable relative to each other.

The biasing member 71 is placed in abutment with the second outer cylinder 52.

The biasing member 71 serves to produce elastic pressure to eliminate clearances or plays between the second inner cylinder 51 and the second balls 53 and between the second outer cylinder 52 and the second balls 53 and clearances or plays between the first inner cylinder 41 and the first balls 43 and between the first outer cylinder 42 and the first balls 43. This minimizes noises arising from mechanical vibration or resonance of the rotor 35 in the axial direction thereof.

d) The first frame 10 is made of a discrete member separate from the casing 5. The electric motor 2 also includes the first sealing member 6 disposed between the first frame 10 and the casing 5 to develop a liquid-tight seal between the first frame 10 and the casing 5. The use of the first sealing member 6 eliminates a risk of entry of water into the casing 5 through a clearance between the first frame 10 and the casing 5.

e) The second frame 20 is made of a discrete member separate from the casing 5. The electric motor 2 also includes the second sealing member 7 disposed between the second frame 20 and the casing 5 to develop a liquid-tight seal between the second frame 20 and the casing 5. The use of the second sealing member 7 eliminate a risk of entry of water into the casing 5 through a clearance between the second frame 20 and the casing 5.

f) The biasing member 71 is, as described above, made of a coiled-wave spring. The surface of the second frame 20 includes the coating-unoccupied area T2 which early corrodes to decelerate corrosion of the biasing member 71, thereby minimizing the risk of the stress corrosion cracking of the biasing member 71 resulting from stress acting thereon or the corrosion thereof. The coiled-wave spring which has a relatively high residual stress generated in a production process thereof and a relative high stress developed when compressed is, therefore, useful as the biasing member 71.

When the coiled wave spring is compressed in the thickness-wise direction, it usually has a small variation in spring pressure over a circumference thereof. The coiled wave spring usually produces a required degree of the spring pressure acting on the second bearing 50 in the thickness-wise direction thereof even if it has a decreased overall thickness. This enables the biasing member 71 to be arranged in a narrow space between the second bottom wall 221 and the second bearing 50 and to exert a required degree of spring pressure on the shaft 60, thus permitting the electric motor 2 to be reduced in size and minimizing the mechanical vibration or noise.

f) The coating 301 is made of alumite film (also called anodic oxide coating), thus facilitating ease with which the coating-occupied areas T1 and the coating-unoccupied area T2 are formed.

g) The electric power steering device 101 is installed in the vehicle 1 and includes the electric motor 2 and the rack gear 90 which is joined to the pulley 61 mounted on the end of the shaft 60 and driven by torque produced by the electric motor 2. When driven, the rack gear 90 that is a controlled object in this embodiment works to output the assist torque to assist the diver in steering the vehicle 1.

h) The rack gear 90 drives the rack shaft 106 joined to the wheels 107 of the vehicle 1. The electric power steering device 101 of this embodiment is designed as a so-called rack-parallel type electric power steering (RP-EPS) system. The biasing member 71 works to produce a relatively great elastic force to press the shaft 60 in the axial direction thereof and is therefore suitable for use in the rack-parallel type electric power steering system which usually requires a relative high degree of pre-spring load.

i) The electric motor 2 is located below the vertical level of the wheels 107 when the vehicle 1 is on the road, thus always subjected to a risk of exposure to water when the vehicle 1 is traveling. The electric motor 2 of this embodiment is, as however, designed to avoid the entry of water thereinto and has a high resistance to rusting or corrosion of the casing 5, the first frame 10, and the second frame 20. The electric motor 2 is, therefore, useful as a drive actuator in the electric power steering device 101.

Second Embodiment

Figure 5:
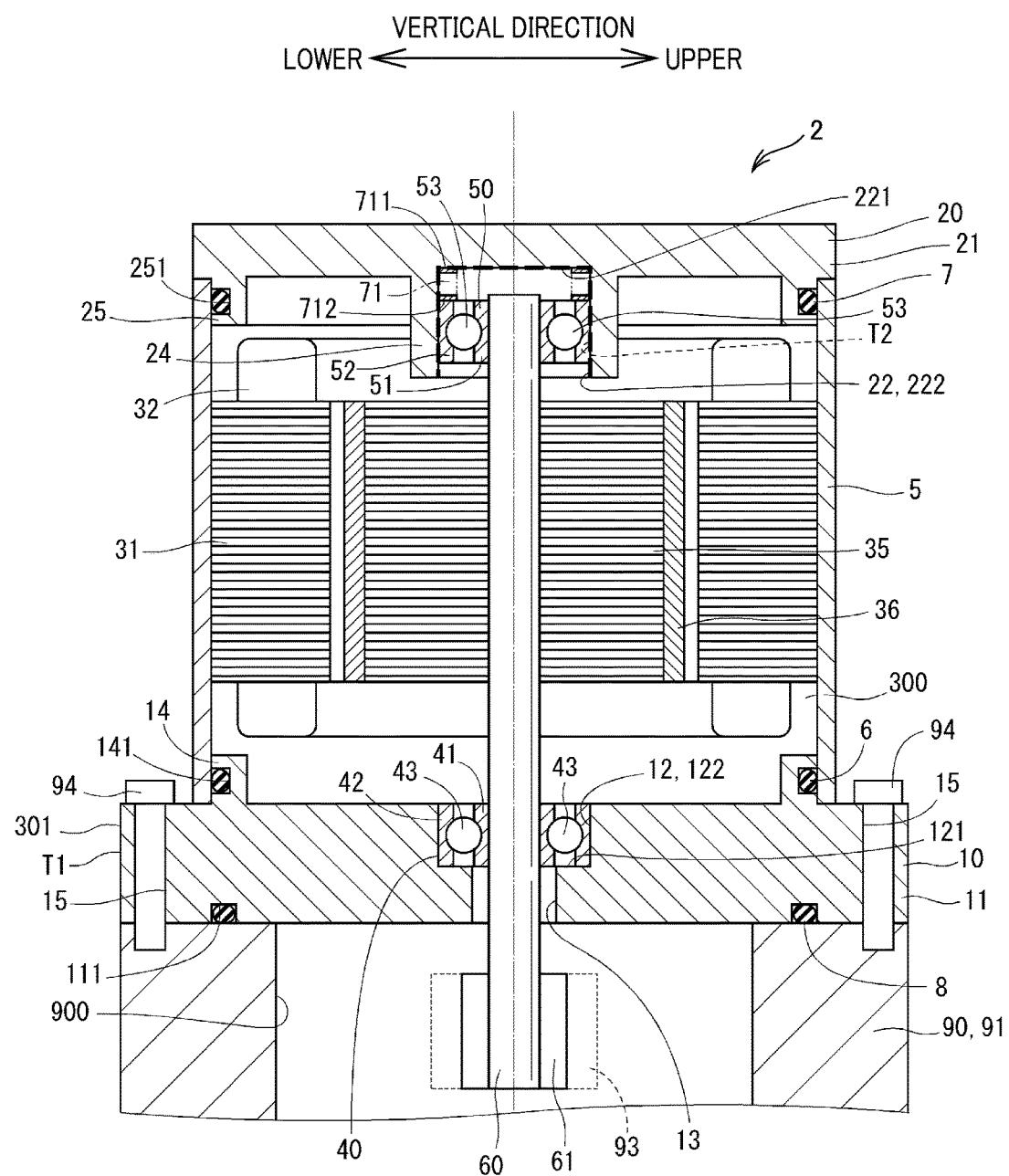
FIG. 5 is a longitudinal sectional view which illustrates an electric motor according to the second embodiment.

FIG. 5 illustrates the electric motor 2 according to the second embodiment which is different from the first embodiment in that it is not equipped with the control unit 80 and the cover 801. The same reference numbers as employed in the first embodiment will refer to the same parts.

The second frame 20 does not have the second hole 23 and the cylinder 26 formed therein.

The shaft 60 has the first end which is farther away from the pulley 61 is located at a given distance from the second bottom wall 221 in the lengthwise direction of the shaft 60. The electric motor 2 is not equipped the magnetic 62 mounted on the first end of the shaft 60.

The coating-unoccupied area T2, as indicated by a thick broken so line in FIG. 5, lies at a portion of the outer surface of the second frame 20 which is occupied by the second bottom wall 221 and the second inner wall 222. In other words, the inner surface of the second recess 22 entirely has the coating-unoccupied area T2.

The operation of the electric motor 2 is controlled by an external device separate from the electric motor 2.

Other arrangements of the electric motor 2 are identical with those in the embodiment, and explanation thereof in detail will be omitted here.

The structure of the electric motor 2 of this embodiment offers substantially the same beneficial advantages as in the first embodiment and enables to be reduced in size thereof.

Third Embodiment

Figure 6:
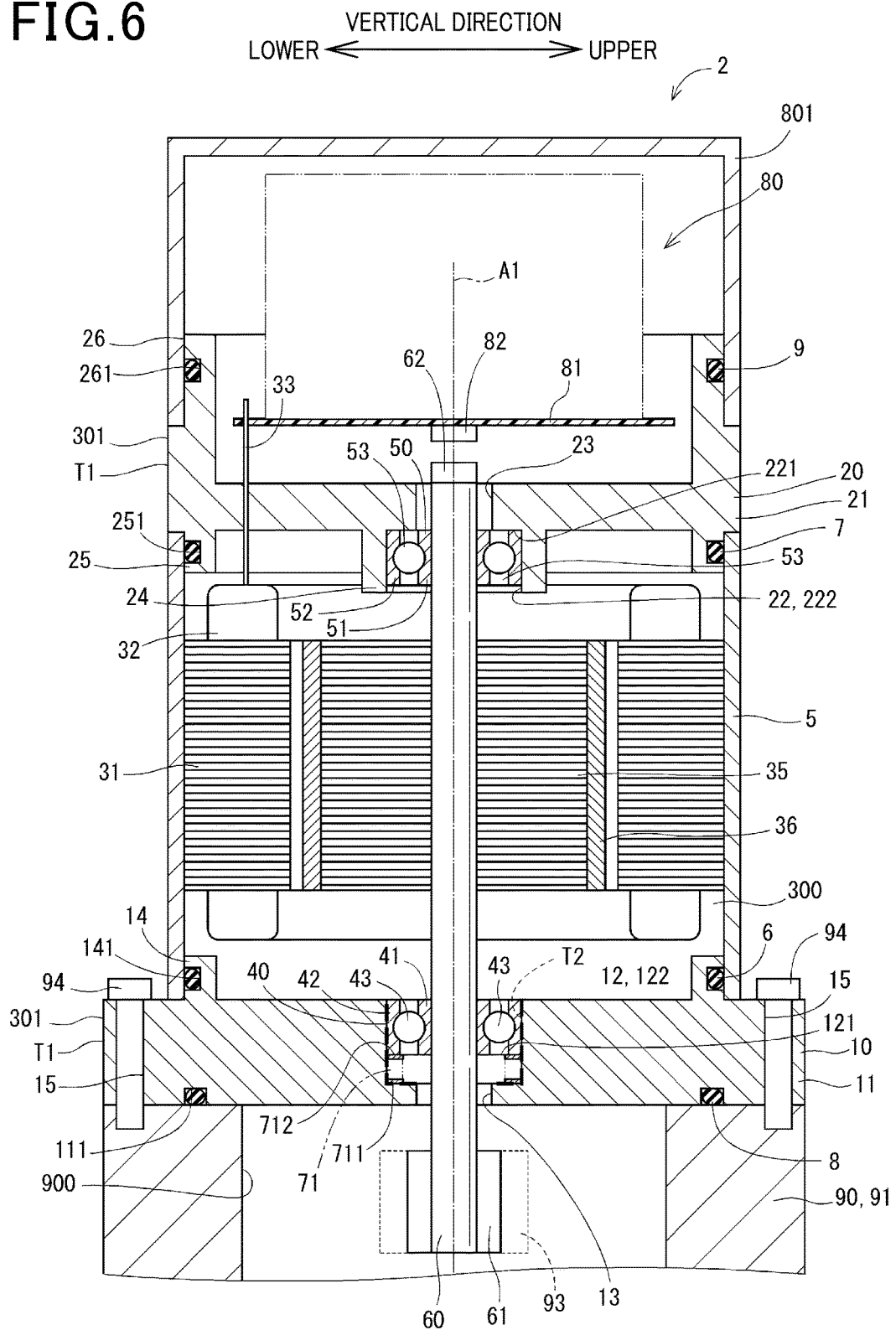
FIG. 6 is a longitudinal sectional view which illustrates an electric motor according to the third embodiment.

FIG. 6 illustrates the electric motor 2 according to the third embodiment which is different in layout of the biasing member 71 from the first embodiment.

The first bearing 40 and the first bottom wall 121 define an annular chamber therebetween. The biasing member 71 is mounted in the annular chamber between the first bottom wall 121 and the first bearing 40 and exert spring load on the shaft 60 through the first bearing 40, thereby pressing the shaft 60 in the lengthwise direction toward the second bearing 50.

Specifically, the biasing member 71 is compressed in the axial direction thereof (i.e., the first bearing 40) and mounted between the first bottom wall 121 and the first bearing 40. The biasing member 71, as can be seen in FIG. 6, has the end 711 placed in contact with the first bottom wall 121 and the end 712 placed in contact with one of opposed ends of the first outer cylinder 42 which faces the first bottom wall 121, so that it biases the first outer cylinder 42 toward the second bearing 50. This causes the biasing member 71 to press the first outer cylinder 42 toward the second bearing 50, so that the first outer cylinder 42 urges the first balls 43 toward the second bearing 50, the first balls 43 urge the first inner cylinder 41 toward the second bearing 50, and then the first cylinder 41 presses the shaft 60 in the axial direction thereof, thereby eliminating clearances or plays between the first inner cylinder 41 and the first balls 43 and between the first outer cylinder 42 and the first balls 43. The biasing member 71 is contactable with the first inner wall 122. When urged by the biasing member 71, the shaft 60 presses the second inner cylinder 51, the second balls 53, and the second outer cylinder 52 of the second bearing 50 away from the first bearing 40, thereby eliminating the plays between the second inner cylinder 51 and the second balls 53 and between the second outer cylinder 52 and the second balls 53 and also pressing the end of the second outer cylinder 52 which faces the second bottom wall 221 against the second bottom wall 221. The inner diameter of the second hole 23 is selected to be greater than the outer diameter of the second inner cylinder 51, so that the second inner cylinder 51 is not stopped by the second bottom wall 221 from moving in the axial direction thereof.

The second frame 20 has the coating-occupied area T1 ranging over the whole of the outer surface thereof. The first frame 10 has the coating-occupied area T1 ranging over a portion of the outer surface thereof other than the first bottom wall 121 and the first inner wall 122. In other words, the first bottom wall 121 and the first inner wall 122 are not coated, that is, the coating-unoccupied area T2, as indicated by a thick broken line in FIG. 6, ranges over a portion of the outer wall of the first frame 10 which forms the first bottom wall 121 and the first inner wall 122.

As apparent from the above discussion, the coating-unoccupied area T2 where the coating 301 is not formed occupies at least a portion of the outer surface of the first frame 10 which faces or physically contacts with the biasing member 71.

The coating-unoccupied area 72 may be formed by masking a portion of the outer surface of the first frame 10 where there are the first bottom wall 121 and the first inner wall 122 and then alumite-treating the outer surface of the first frame 10.

The structure of the electric motor 2 of the third embodiment also offers substantially the same beneficial advantages as in the first embodiment.

a) The biasing member 71 is, as described above, arranged between the first bottom wall 121 that is the bottom of the first recess 12 and the first bearing 40 and presses the shaft 60 through the first bearing 40 in the axial direction thereof. The coating-unoccupied area T2 occupies at least a portion of the surface of the first frame 10 which faces the biasing member 71, thereby minimizing noises arising from mechanical vibration of the rotor 35 and also sacrificially inducing the corrosion of the surface of the first frame 10 (i.e., the coating-unoccupied area T2) which is made of metallic material containing aluminum, which will minimize the risk of the stress corrosion cracking in the biasing member 71 resulting from stress acting thereon or corrosion thereof.

Fourth Embodiment

Figure 7:
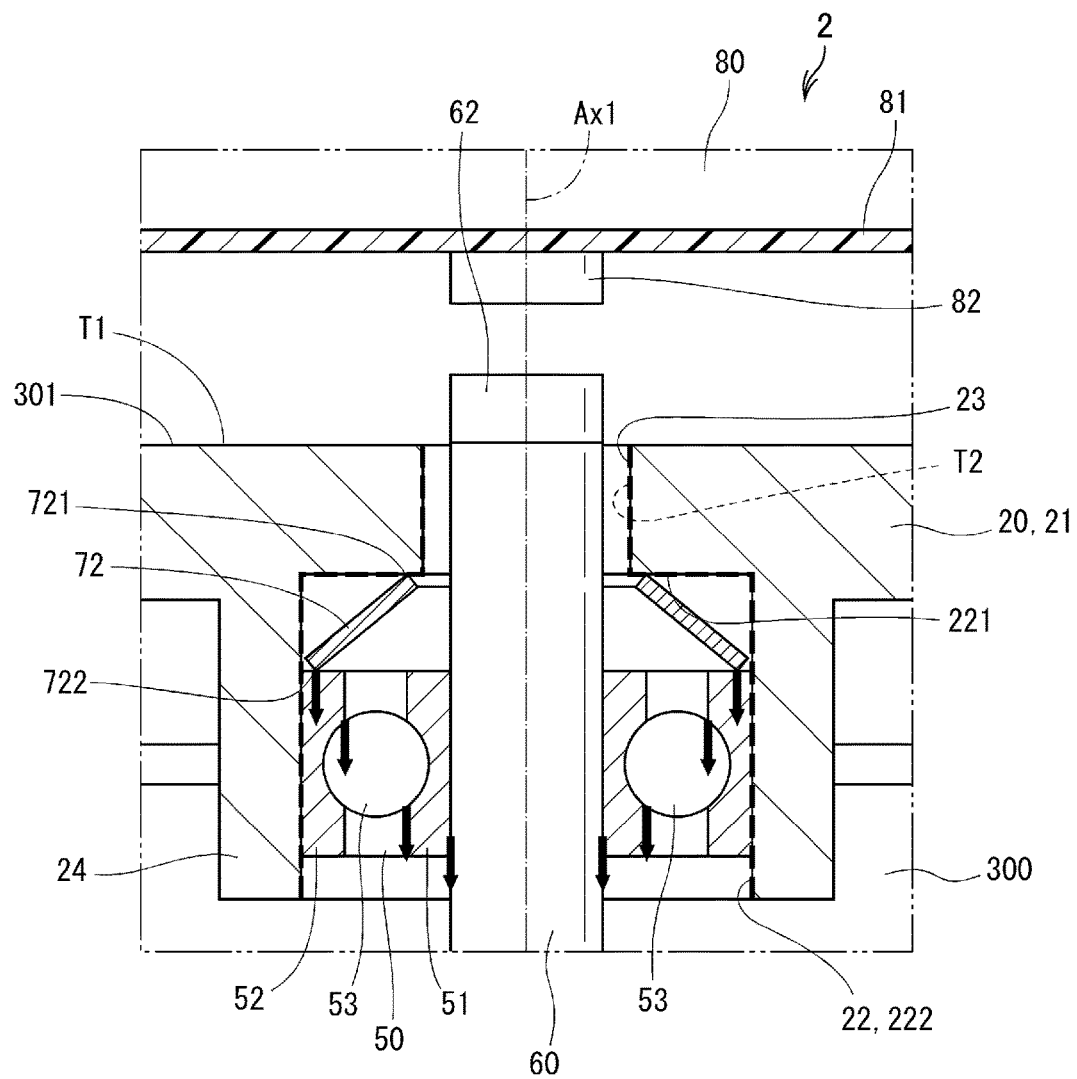
FIG. 7 is a partially enlarged sectional view which illustrates an electric motor in which a biasing member is mounted according to the fourth embodiment.

FIG. 7 is a partial longitudinal sectional view which illustrates the electric motor 2 according to the fourth embodiment which is equipped with the biasing member 72 different in structure from the biasing member 71 used in the first embodiment.

The biasing member 72 is disposed between the second bottom wall 221 and the second bearing 50 of the electric motor 2. The biasing member 72 biases or presses the shaft 60 through the second bearing 50 in the axial direction thereof toward the first bearing 40.

The biasing member 72 is made of austenite stainless steel and implemented in this embodiment by a disc spring.

Specifically, the biasing member 72 is compressed in the axial direction thereof (i.e., the second bearing 50) and mounted between the second bottom wall 221 and the second bearing 50. The biasing member 71, as can be seen in FIG. 7, has the end 721 placed in contact with the second bottom wall 221 and the end 722 placed in contact with one of opposed ends of the second outer cylinder 52 which faces the second bottom wall 221, so that it biases the second outer cylinder 52 toward the first bearing 40. This causes the second outer cylinder 52 to press the second balls 53 toward the first bearing 40, so that the second balls 53 urge the second inner cylinder 51 toward the first bearing 40, and then the second inner cylinder 51 presses the shaft 60 in the lengthwise direction of the shaft 60. This causes the plays between the second inner cylinder 51 and the second balls 53 and between the second outer cylinder 52 and the second balls 53 to be eliminated. In FIG. 7, forces or pressures exerted by one of parts on another are indicate by black arrows. The biasing member 72 is contactable with the second inner wall 222.

The second frame 20 has the coating-occupied area T1 provided on the outer surface thereof other than the second bottom wall 221, the second inner wall 222, and the inner wall of the second hole 23. In other words, the coating-unoccupied area T2, as indicated by a thick broken line in FIG. 7, ranges over the second bottom wall 221, the second inner wall 222, and the inner wall of the second hole 23.

As apparent from the above discussion, the coating-unoccupied area T2 where the coasting 301 is not formed occupies at least a portion of the outer surface of the second frame 20 which faces or physically contacts with the biasing member 72.

The coating-unoccupied area T2 may be formed by masking a portion of the outer surface of the second frame 20 where there are the second bottom wall 221, the second inner wall 222, and the second hole 23 and then alumite-treating the outer surface of the second frame 20.

Other arrangements of the electric motor 2 are identical with those in the first embodiment, and explanation thereof in detail is omitted here.

The structure of the electric motor 2 of the fourth embodiment offers substantially the same benefits as in the first embodiment and also has an advantage that the structure of the biasing member 72 is simpler.

Fifth Embodiment

Figure 8:
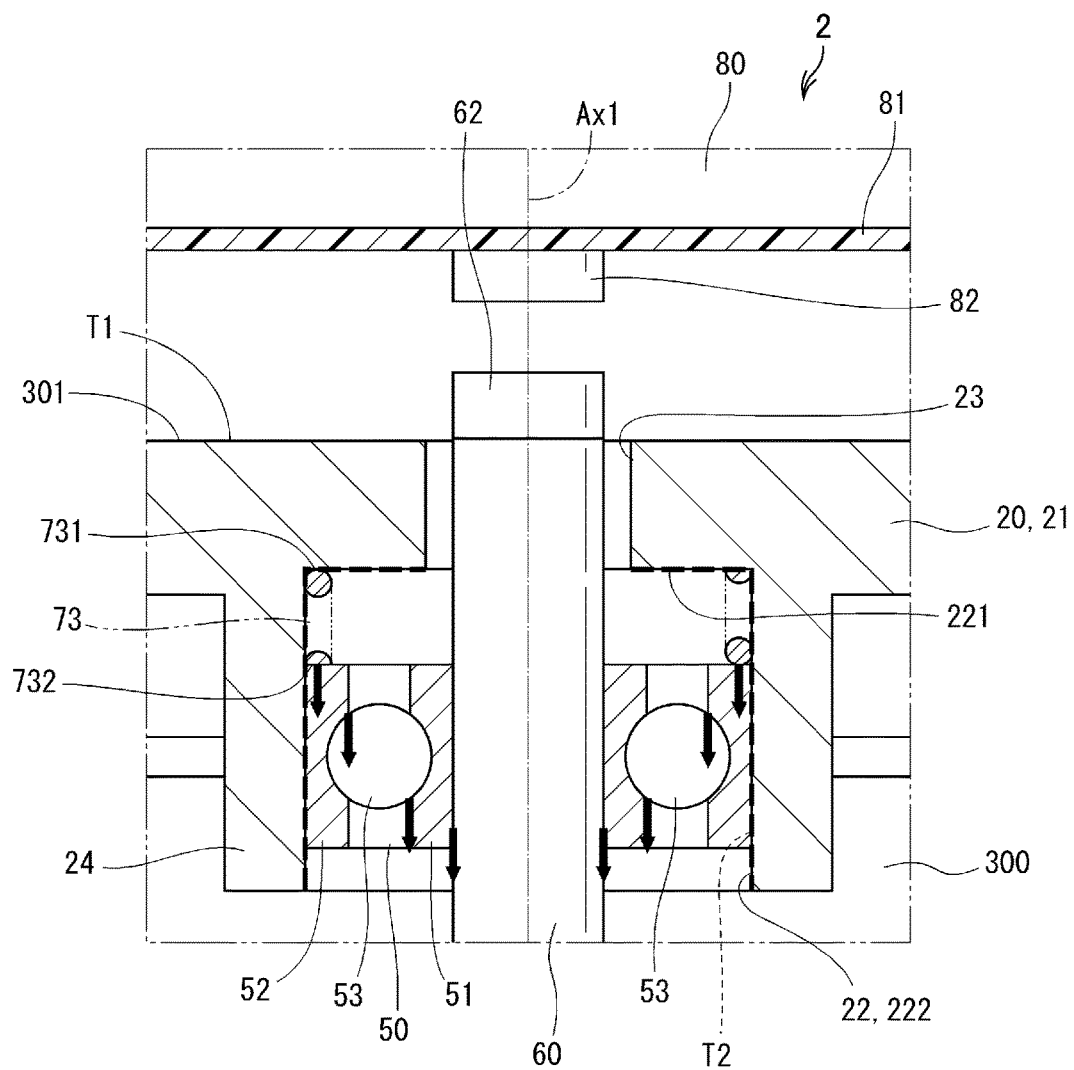
FIG. 8 is a partially enlarged sectional view which illustrates an electric motor in which a biasing member is mounted according to the fifth embodiment.

FIG. 8 illustrates the electric motor 2 according to the fifth embodiment which is equipped with the biasing member 73 different in structure from the biasing member 71 of the first embodiment.

The biasing member 73 is disposed between the second bottom wall 221 and the second bearing 50.

The biasing member 73 works to elastically press the shaft 60 through the second bearing 50 in the axial direction thereof toward the first bearing 40.

The biasing member 73 is made of austenite stainless steel and implemented in this embodiment by a coil spring.

Specifically, the biasing member 73 is compressed in the axial direction thereof (i.e., the second bearing 50) and mounted in an annular chamber defined between the second bottom wall 221 and the second bearing 50. The biasing member 73, as can be seen in FIG. 8, has the end 731 placed in contact with the second bottom wall 221 and the end 732 placed in contact with one of opposed ends of the second outer cylinder 52 which faces the second bottom wall 221, so that it biases the second outer cylinder 52 toward the first bearing 40. This causes the second outer cylinder 52 to press the second balls 53 toward the first bearing 40, so that the second balls 53 urge the second inner cylinder 51 toward the first bearing 40, and then the second inner cylinder 51 presses the shaft 60 in the lengthwise direction of the shaft 60. This causes clearances or plays between the second inner cylinder 51 and the second balls 53 and between the second outer cylinder 52 and the second balls 53 to be eliminated. In FIG. 8, forces or pressures exerted by one of parts on another are indicate by black arrows. The biasing member 73 is contactable with the second inner wall 222.

The second frame 20 has the coating-occupied area T1 defined on the outer surface thereof other than the second bottom wall 221 and the second inner wall 222. In other words, the coating-unoccupied area T2, as indicated by a thick broken line in FIG. 8, ranges over the second bottom wall 221 and the second inner wall 222.

As apparent from the above discussion, the coating-unoccupied area T2 where the coasting 301 is not formed occupies at least a portion of the outer surface of the second frame 20 which faces or physically contacts with the biasing member 72.

Other arrangements of the electric motor 2 are identical with those in the first embodiment, and explanation thereof in detail is omitted here.

The structure of the electric motor 2 of the fourth embodiment offers substantially the same benefits as in the first embodiment and also has an advantage that the structure of the biasing member 73 is simpler.

Modifications

The biasing member 71, 72, or 73 in each of the above embodiments is disposed either between the first bottom wall 121 and the first bearing 40 or between the second bottom wall 221 and the second bearing 50, but however, the electric motor 2 in each of the embodiments may also include two elastic members 71, 72, or 73: one arranged between the first bottom wall 121 and the first bearing 40, and one arranged between the second bottom wall 221 and the second bearing 50.

The coating-unoccupied area T2 is formed using the masking techniques in each of the above embodiment, but however, may alternatively be created by coating the whole of the outer surface of the first frame 10 or the second frame 20 and the removing a selected portion of the outer surface by means of after-treatment such as polishing, grinding, or cutting.

The coating-unoccupied area T2 may be formed only in a portion of the outer surface of the first frame 10 or the second frame 20 with which the biasing member 71, 72, or 73 physically contacts or which is exposed to the biasing member 71, 72, or 73.

The biasing member 71, 72, or 73 may alternatively be placed in physical contact with the first inner cylinder 41 or the second inner cylinder 51. In this case, the plays of the first bearing 40 or the second bearing 50 may be eliminated by holding the first outer cylinder 42 or the second outer cylinder 52 from moving relative to the first frame 10 or the second frame 20.

The first bearing 40 or the second bearing 50 may alternatively implemented by a bearing other than a ball bearing.

The first frame 10 may alternatively be formed integrally with the casing 5. This eliminates the need for the first sealing member 6. The second frame 20 may alternatively be formed integrally with the casing 5. This eliminates the need for the second sealing member 7.

The biasing member 71, 72, or 73 may alternatively be implemented by a waved washer.

The coating 301 is, as described above, an anodic oxide coating formed on the first frame 10 and/or the second frame 20 by means of the alumite treatment, but however, may alternatively be made of a cation electrodeposition coasting formed by means of electrodeposition coating techniques or a plated coating or layer.

The electric motor 2 may be designed to have some of the features of the above embodiments which are combined unless it constitutes obstructive factors.

The electric motor 2, as described above, has the pulley 61 mounted on the end of the shaft 60 to transmit torque, as produced by the electric motor 2, to the rack gear 90 through the belt 93, but however, may alternatively be designed to have a joint such as a coupler mounted on the end of the shaft 60 to deliver the torque output from the electric motor 2 to the rack gear 90 through the joint.

The casing 5 may be made of metallic material containing aluminum as well as iron and also be subjected to surface treatment to enhance a resistance thereof to corrosion.

In each of the above embodiments, the electric motor 2 is entirely located beneath the vertical level of the upper ends of the wheels 107 of the vehicle 1, but however, may alternatively be arranged to have at least a portion arranged above that vertical level.

The electric motor 2 in each of the above embodiments is used with the electric power steering device 101, but however, may be employed with another type of actuator which has a risk of being flushed with water.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. An electric motor which drives a given target comprising: a cylindrical casing which has a first end and a second end opposed to the first end; a first frame which is made of metallic material containing aluminum and covers the first end of the cylindrical casing, the first frame having a first recess and a first hole formed therein, the first recess being formed in a middle portion of the first frame which faces the cylindrical casing, the first hole communicating between one of surfaces of the first frame which is farther away from the cylindrical casing and a first bottom wall that is a bottom of the first recess; a second frame which is made of metallic material containing aluminum and covers the second end of the cylindrical casing to define a storage chamber between itself and the first frame in the cylindrical casing, the second frame having a second recess formed in a middle portion thereof which faces the cylindrical casing; an annular stator which is disposed in the storage chamber coaxially with the cylindrical casing, the annular stator being held from rotating relative to the cylindrical casing; a winding wound around the stator; a first bearing which is mounted in the first recess with an outer wall thereof fit in a first inner wall that is a cylindrical inner wall of the first recess; a second bearing which is mounted in the second recess with an outer wall thereof fit in a second inner wall that is a cylindrical inner wall of the second recess; a shaft which has a given length with a first end portion and a second end portion and is retained by the first frame and the second frame to be rotatable, the first end portion passing through the first hole to connect with the target and having an outer wall fit in an inner wall of the first bearing so that the first end portion is retained by the first bearing, the second end portion having an outer wall fit in an inner wall of the second bearing, so that the second end portion is retained by the second bearing; a rotor which has an outer wall facing an inner wall of the stator and an inner wall fit on an outer wall of the shaft, so that the rotor is rotatable together with the shaft; a biasing member which is made of austenite stainless steel and disposed between the first bottom wall and the first bearing or between a second bottom wall that is a bottom wall of the second recess and the second bearing, the biasing member urging the shaft through the first bearing or the second bearing in an axial direction of the shaft; and a coating which is disposed on an outer surface of the first frame or the second frame, wherein the outer surface of the first frame or the second frame includes a coating-occupied area where there is the coating and a coating-unoccupied area where there is not a coating, the coating-unoccupied area being provided on at least a portion of the outer surface of the first frame or the second frame which faces the biasing member.

2. An electric motor as set forth in claim 1, wherein the second frame has formed therein a second hole which communicates between a surface of the second frame which is farther away from the casing and the second bottom wall, wherein the shaft has the second end portion inserted into the second hole, and further comprising a magnet, a magnetic flux, and a control unit, the magnet being secured to an end of the second end portion of the shaft, the magnetic flux sensor being arranged on an opposite side of the second frame to the casing and so working to measure a magnetic flux, as produced by the magnet and output a signal indicative thereof, the control unit working to control electric power delivered to the winding based on the signal outputted from the magnetic flux sensor to control rotation of the rotor.

3. An electric motor as set forth in claim 1, wherein the first bearing includes a first inner cylinder, a first outer cylinder, and a plurality of first balls, the first inner cylinder having an inner wall fit on the outer wall of the shaft and being held from moving relative to the shaft, the first outer cylinder having an outer wall fit in the first inner wall of the first recess and being movable relative to the first frame, the first balls being disposed between the first inner cylinder and the first outer cylinder to permit the first inner cylinder and the first outer cylinder to rotate relative to one another, wherein the second bearing includes a second cylinder, a second outer cylinder, and a plurality of second balls, the second inner cylinder having an inner wall fit on the outer wall of the shaft and being held from moving relative to the shaft, the second outer cylinder having an outer wall fit in the second inner wall of the second recess and being movable relative to the second frame, the second balls being disposed between the second inner cylinder and the second outer cylinder to permit the second inner cylinder and the second outer cylinder to rotate relative to one another, and wherein the biasing member is placed in contact with the first outer cylinder or the second outer cylinder.

4. An electric motor as set forth in claim 1, wherein the first frame is made of a discrete member separate from the casing, and further comprising a first sealing member disposed between the first frame and the casing to create a liquid-tight seal between the first frame and the casing.

5. An electric motor as set forth in claim 1, wherein the second frame is made of a discrete member separate from the casing, and further comprising a second sealing member disposed between the second frame and the casing to create a liquid-tight seal between the second frame and the casing.

6. An electric motor as set forth in claim 1, wherein the biasing member is implemented by one of a coiled wave spring, a disc spring, a coil spring, and a wave washer.

7. An electric motor as set forth in claim 1, wherein the coating is made of one of an anodic oxide coating, a cation electrodeposition coasting, and a plated coating.

8. An electric power steering device for a vehicle comprising: an electric motor which includes (a) a cylindrical casing which has a first end and a second end opposed to the first end, (b) a first frame which is made of metallic material containing aluminum and covers the first end of the cylindrical casing, the first frame having a first recess and a first hole formed therein, the first recess being formed in a middle portion of the first frame which faces the cylindrical casing, the first hole communicating between one of surfaces of the first frame which is farther away from the cylindrical casing and a first bottom wall that is a bottom of the first recess, (c) a second frame which is made of metallic material containing aluminum and covers the second end of the cylindrical casing to define a storage chamber between itself and the first frame in the cylindrical casing, the second frame having a second recess formed in a middle portion thereof which faces the cylindrical casing; (d) an annular stator which is disposed in the storage chamber coaxially with the cylindrical casing, the annular stator being held from rotating relative to the cylindrical casing; (e) a winding wound around the stator; (f) a first bearing which is mounted in the first recess with an outer wall thereof fit in a first inner wall that is a cylindrical inner wall of the first recess; (g) a second bearing which is mounted in the second recess with an outer wall thereof fit in a second inner wall that is a cylindrical inner wall of the second recess; (h) a shaft which has a given length with a first end portion and a second end portion and is retained by the first frame and the second frame to be rotatable, the first end portion passing through the first hole to connect with a target and having an outer wall fit in an inner wall of the first bearing so that the first end portion is retained by the first bearing, the second end portion having an outer wall fit in an inner wall of the second bearing, so that the second end portion is retained by the second bearing; (i) a rotor which has an outer wall facing an inner wall of the stator and an inner wall fit on an outer wall of the shaft, so that the rotor is rotatable together with the shaft; (j) a biasing member which is made of austenite stainless steel and disposed between the first bottom wall and the first bearing or between a second bottom wall that is a bottom wall of the second recess and the second bearing, the biasing member urging the shaft through the first bearing or the second bearing in an axial direction of the shaft; and (k) a coating which is disposed on an outer surface of the first frame or the second frame, the outer surface of the first frame or the second frame including a coating-occupied area where there is the coating and a coating-unoccupied area where there is not the coating, the coating-unoccupied area being provided on at least a portion of the outer surface of the first frame or the second frame which faces the biasing member; and the target object which is connected to an end of the shaft and driven by the electric motor to produce assist torque which assists a steering wheel of a vehicle in steering the vehicle.

9. An electric power steering device as set forth in claim 8, wherein the target object works to drive a rack shaft joined to a wheel of the vehicle.

10. An electric power steering device as set forth in claim 9, wherein the electric motor is at least partially located beneath a vertical level of an upper end of the wheel of the vehicle.

* * * * *